B. F. UMBOWER.
PLOW TRACTOR, STOP DRAFT GEAR.
APPLICATION FILED OCT. 3, 1918.
1,307,383.
Patented June 24, 1919.
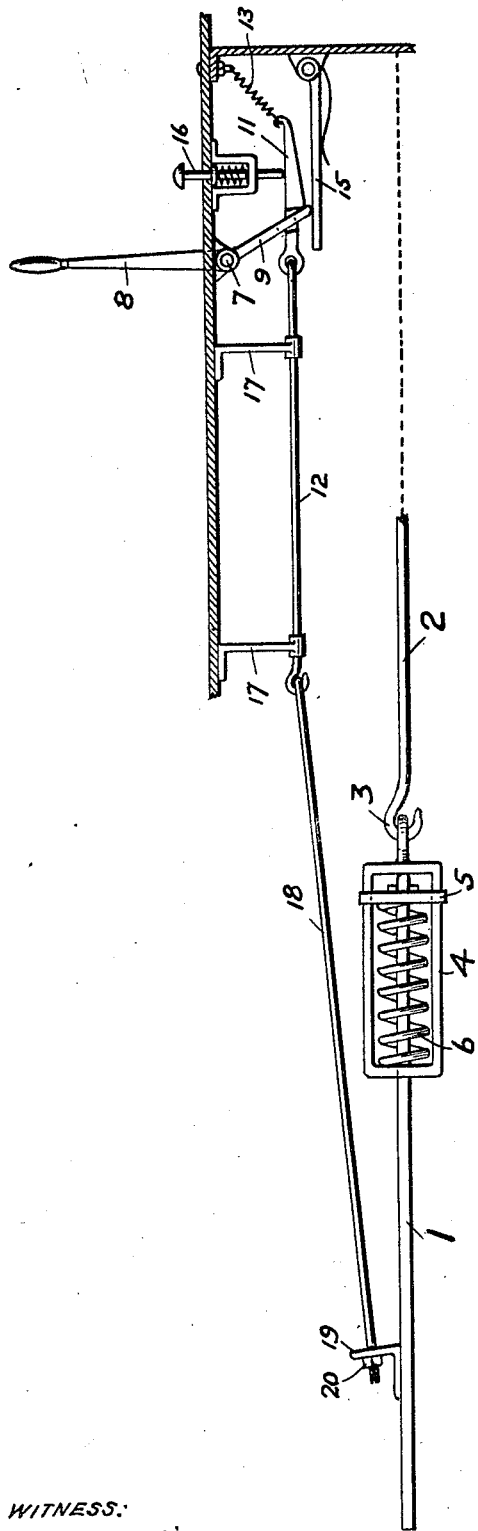
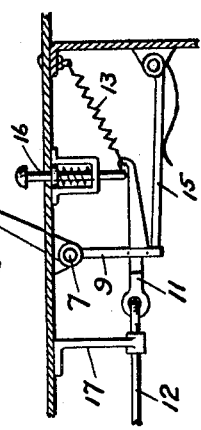
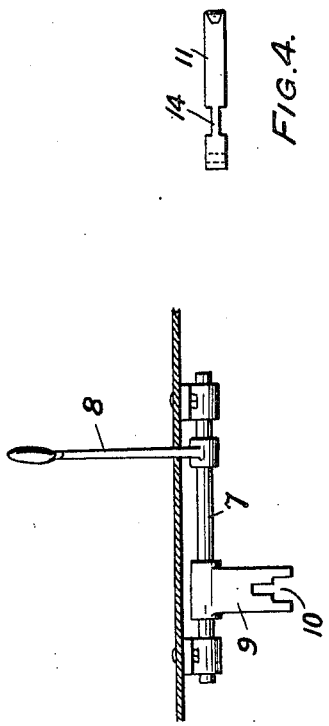
INVENTOR
Benjamin Franklin Umbower
BY
Chas. F. Van Horn
ATTORNEY
WITNESS:
Rob't P. Kitchel.

UNITED STATES PATENT OFFICE.

BENJAMIN FRANKLIN UMBOWER, OF ROYER, PENNSYLVANIA.

PLOW-TRACTOR, STOP DRAFT-GEAR.

1,307,383.    Specification of Letters Patent.    Patented June 24, 1919.

Application filed October 3, 1918. Serial No. 256,767.

*To all whom it may concern:*

Be it known that I, BENJAMIN FRANKLIN UMBOWER, a citizen of the United States, and a resident of Royer, in the county of Blair and State of Pennsylvania, have invented a certain new and useful Plow-Tractor, Stop Draft-Gear, of which the following is a specification.

The principal objects of the present invention are, first, to facilitate the operation of plowing ground containing roots, rocks and other obstructions, by means of a tractor; second, to provide for automatically stopping the tractor when the plow is arrested by contact with an obstruction greater than the power of the tractor can overcome, and third, to provide for enabling the operator to start the tractor again after it has been thus automatically stopped.
Stop-draft-gear embodying the invention comprises, generally stated, the combination of draw-bar mechanism interposed between the tractor and the plow and adapted to elongate when strained beyond pre-determined limits, a relatively non-elongatable connection interposed between the plow and the power plant of the tractor and adapted to automatically stop the tractor when the plow is arrested by an obstruction greater than the tractor can overcome, and means whereby the tractor may be re-started by the operator.

The invention further comprises the improvements to be presently described and finally claimed.

For the sake of a further description of the invention reference will be made to the accompanying drawings illustrating one embodiment of it, and in which—
Figure 1, is a side view.
Fig. 2, is an end view of a part of the mechanism shown in Fig. 1.
Fig. 3, is a view showing the parts illustrated at the right in Fig. 1, in another position, and
Fig. 4, is a top or plan view of one of the parts shown in Figs. 1 and 3.

In the drawings the elongatable draw-bar mechanism is shown to comprise an element 1 connected with the plow or plows, not shown, and with an element connected with the tractor, not shown. Connected with the element 2, as by a hook-and-eye 3, is a link 4 slidable on the element 1, and the element 1 is provided with a yoke 5 slidable in respect to the link 4 and between the yoke and link is a compression spring 6. Pull on the element 2 will be transmitted to the element 1 within certain limits without substantial compression of the spring 6, but pull beyond those limits will compress the spring 6 and so the connection as a whole will be elongated for a purpose that will be presently described. 7, is the starting shaft of a tractor and it is provided with a hand lever 8 and with an arm 9, shown as provided with a notch 10, having a comparatively wide outer and a comparatively narrow inner opening. 11, is a tongue pivoted to a rod 12 and acted upon by a spring 13. This tongue is shown as adapted to work in the wide part of the notch 10 and it is provided with a contracted portion 14, adapted to fit the narrow portion of the notch 10 and to connect the tongue and arm together. 15, is a pivotal spring latch adapted to work under the end of the arm 9 and also to abut on the arm 9. 16 is a spring retracted push arm or pedal adapted to operate upon the tongue 11. The rod 12 is shown as arranged to work in suitable guides 17 and it is hooked to a link 18 and by that link connected with the element 1, or with some part connected with the plow or plows, and as shown, this is accomplished by means of a bracket 19 and an adjusting nut 20. In comparison with the draft connection 1, 6, 2, and accessories, the tractor control connection 18, 12, 11 and accessories, is non-elongatable.

Fig. 1, shows the position of the various parts during the operation of plowing, so that the elements 1 and 2 are hooked together and operate as a draw-bar connection and the rod 12 and link 18 are hooked together and the spring tongue is held with its contracted portion 14 in the narrow part of the slot 10 of the arm 9. Should the plow be arrested by an obstruction greater than the power of the tractor, the tractor will proceed for a very short distance and the spring 6 will be subjected to such a strain that the draw-bar connection, as a whole, will elongate, but the control connection 18, 12 will not elongate, but will turn the arm 9 toward the left in Fig. 1, so turning the shaft 7 into what may be called neutral position for stopping the tractor. The spring locking plate 15 abuts upon the arm 9, as shown in Fig. 3 and so locks the arm 9 in the described position. From the foregoing description it is apparent that the tractor is automatically stopped when the obstruction to the plow is greater than the tractor can overcome. The advantage of this is obvious but it may be said that by means of the present invention it is comparatively easy to plow some fields with a tractor which fields, without the invention, could not be practically plowed with a tractor.

To start the tractor, either to back it up to remove the obstruction to the plow or to cause it to go ahead after the obstruction has been otherwise removed, the operator pushes the push pedal or rod 16 with the result that the tongue is turned downward so that its contracted portion 14 disengages the narrow part of the slot 10 and enters the wide part of the slot 10, in which the arm 9 can be turned freely in respect to the tongue and this downward movement of the tongue 11 also turns the locking plate 15 downward clear of the arm 9, so that the arm 9 is quite free and the shaft 7 can be turned by the handle 8.

It will be obvious to those skilled in the art to which the invention relates that modifications can be made in details of construction and arrangement without departing from the spirit of the invention, which is not limited as to those matters or otherwise than as the prior state of the art and the appended claims may require.

I claim:

1. A plow tractor stop-draft-gear comprising the combination of a tractor stopping element, a permanently connected elongatable draw-bar, and a non-elongatable stop-motion mechanism directly connected with the stopping element for transmitting the traction-pull to the stopping element for stopping the tractor, and means for putting the stop-motion mechanism out of action, substantially as described.

2. A plow-tractor, stop-draft-gear comprising the combination of a draw-bar consisting of two elements having a spring interposed between them, a tractor starting shaft provided with an arm, a rod connection provided with a pivotal spring tongue adapted to engage and disengage said arm, a spring locking plate adapted to engage the arm and controlled by the tongue, and a push-rod for positioning the tongue.

3. A plow-tractor, stop-draft-gear comprising the combination of a spring draw-bar, a link and rod adapted for connection to the draw-bar, a tractor starting shaft provided with an arm having a notch, a spring tongue pivotally connected to the rod and provided with a contracted portion adapted to engage and disengage said notch, a spring pivotal locking plate adapted to engage and disengage the arm, and a spring retracted push-rod for positioning the tongue, substantially as described.

BENJAMIN FRANKLIN UMBOWER.